(12) United States Patent
Shibuya et al.

(10) Patent No.: US 7,677,325 B2
(45) Date of Patent: Mar. 16, 2010

(54) PNEUMATIC TOOL

(75) Inventors: Kuniaki Shibuya, Tokyo (JP);
Munenori Yamaguchi, Tokyo (JP);
Yasumasa Suzuki, Tokyo (JP); Takashi Nakajoh, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 61 days.

(21) Appl. No.: 11/988,542

(22) PCT Filed: Jul. 11, 2006

(86) PCT No.: PCT/JP2006/313756
§ 371 (c)(1),
(2), (4) Date: Jan. 10, 2008

(87) PCT Pub. No.: WO2007/007745
PCT Pub. Date: Jan. 18, 2007

(65) Prior Publication Data
US 2009/0107690 A1   Apr. 30, 2009

(30) Foreign Application Priority Data

Jul. 13, 2005  (JP) .............................. 2005-204593
Feb. 8, 2006   (JP) .............................. 2006-031507

(51) Int. Cl.
*B23Q 5/26* (2006.01)
(52) U.S. Cl. ........................... 173/14; 173/19; 173/114; 173/211
(58) Field of Classification Search .................. 173/14, 173/13, 19, 114, 200, 201, 204, 121, 212, 173/221, 168, 169, 211
See application file for complete search history.

(56) References Cited

U.S. PATENT DOCUMENTS 3,802,516 A * 4/1974 Speicher ...................... 173/15

(Continued)

FOREIGN PATENT DOCUMENTS

EP           0 017 635          10/1980

(Continued)

OTHER PUBLICATIONS

International Search Report issued Aug. 15, 2006 in the International (PCT) Application of which the present application is the U.S. National Stage.

(Continued)

*Primary Examiner*—Paul R Durand
(74) *Attorney, Agent, or Firm*—Wenderoth, Lind & Ponack L.L.P.

(57) ABSTRACT

The invention of this application provides a pneumatic tool with a simple structure. The tool has a tubular housing, a stationary shaft, a first piston slidable along the stationary shaft, a second piston, a tool attachment member drivingly connected to the second piston, a compressed air supply path extending through the stationary shaft to supply compressed air between the first and second pistons, and an air discharge path for discharging the compressed air supplied between the first and second pistons to the outside of the housing when the first and second pistons are separated by a predetermined distance. The compressed air supply path has an axial portion in the stationary shaft and a radial portion, a compressed air inlet recess in the inner wall surface of a shaft sliding hole, and a supply outlet extending forward from the forward end of the compressed air inlet recess and communicating with a portion between the first and second pistons.

7 Claims, 3 Drawing Sheets

U.S. PATENT DOCUMENTS

| | | | | |
|---|---|---|---|---|
| 4,355,564 A | | 10/1982 | Gidlund | |
| 4,534,422 A | * | 8/1985 | Rear | 173/206 |
| 4,605,073 A | * | 8/1986 | Nilsson et al. | 173/51 |
| 4,998,353 A | | 3/1991 | Fukuda et al. | |
| 5,755,292 A | * | 5/1998 | Nilsson et al. | 173/13 |
| 5,971,083 A | * | 10/1999 | Wiklund | 173/19 |
| 6,050,347 A | * | 4/2000 | Jenne | 173/91 |
| 6,123,242 A | * | 9/2000 | Kersten | 227/10 |

FOREIGN PATENT DOCUMENTS

| | | |
|---|---|---|
| EP | 0 906 810 | 4/1999 |
| JP | 48-18364 | 3/1973 |
| JP | 55-157486 | 12/1980 |
| JP | 56-112241 | 9/1981 |
| JP | 4-2781 | 1/1992 |
| JP | 2000-218570 | 8/2000 |
| JP | 2002-200581 | 7/2002 |
| JP | 2005-11602 | 4/2005 |
| JP | 2005-205514 | 8/2005 |

OTHER PUBLICATIONS

Chinese Office Action issued Sep. 25, 2009 in corresponding Chinese Application No. 200680025333.3 (with translation).

* cited by examiner

PNEUMATIC TOOL

BACKGROUND OF THE INVENTION

I. Technical Field

The present invention relates to pneumatic tools such as reciprocating tools, e.g. a hand-held saw reciprocatively driven by compressed air, and pneumatic rotary tools, e.g. a hand-held grinding tool driven to oscillate by compressed air.

II. Description of the Related Art

There have heretofore been developed pneumatic tools having various structures (for example, see Japanese Examined Utility Model Application Publication No. Hei 4-2781 (JP '781) and U.S. Pat. No. 5,755,292 (U.S. '292)).

These conventional pneumatic tools suffer, however, from problems such as a complicated structure, a relatively heavy weight, and a high air consumption. Further, supply and discharge of compressed air may fail to be smoothly performed, resulting in an interference with the operation of the tool concerned.

SUMMARY OF THE INVENTION

The present invention has been made in view of the above-described circumstances, and it is an object of the present invention to provide a pneumatic tool that is simple in structure and light in weight and yet capable of smoothly supplying and discharging air.

The present invention provides a pneumatic tool including a tubular housing, a stationary shaft extending in the housing forward from a rear end thereof in an axial direction of the housing, a first piston having a shaft sliding hole longitudinally extending therethrough and slidably engaged with the stationary shaft so that the first piston is slidable along the stationary shaft, a second piston provided at a forward end of the first piston, and a tool attachment member drivingly connected to the second piston and extending forward in the axial direction through a forward end of the housing. The tool attachment member is configured to attach a tool to a forward end thereof. The pneumatic tool further includes a first urging means that urges the first piston forward, a second urging means that urges the second piston rearward, a compressed air supply path extending through the stationary shaft to supply compressed air between the first and second pistons, and an air discharge path for discharging the compressed air supplied between the first and second pistons to the outside of the housing when the first and second pistons are driven rearward and forward, respectively, and separated by a predetermined distance by the compressed air supplied therebetween against the first and second urging means. The compressed air supply path has an axial portion extending in the stationary shaft toward a forward end thereof, a radial portion extending radially from the axial portion and opening on the side surface of the stationary shaft, and a compressed air inlet space formed between the inner wall surface of the shaft sliding hole and the outer peripheral surface of the stationary shaft. The compressed air inlet space is communicated with the radial portion of the compressed air supply path to receive compressed air. Compressed air is supplied between the first and second pistons from the axial portion through the radial portion, the compressed air inlet space and a forward end portion of the shaft sliding hole. When the first and second pistons are driven to move away from each other by a predetermined distance by compressed air supplied therebetween, the forward end portion of the shaft sliding hole reaches a forward end portion of the stationary shaft, so that the forward end portion of the stationary shaft blocks compressed air from being supplied between the first and second pistons from the compressed air inlet space through the forward end portion of the shaft sliding hole, and the compressed air supplied between the first and second pistons is discharged to the outside of the housing through the air discharge path.

The compressed air inlet space may be formed between a recess formed in the inner wall surface of the shaft sliding hole and the outer peripheral surface of the stationary shaft.

In addition, the present invention provides a pneumatic tool including a tubular housing, a stationary shaft extending in the housing forward from a rear end thereof in an axial direction of the housing, a first piston having a shaft sliding hole longitudinally extending therethrough and slidably engaged with the stationary shaft so that the first piston is slidable along the stationary shaft, a second piston provided at a forward end of the first piston, and a tool attachment member drivingly connected to the second piston and extending forward in the axial direction through a forward end of the housing. The tool attachment member is configured to attach a tool to a forward end thereof. The pneumatic tool further includes a first urging means that urges the first piston forward, a second urging means that urges the second piston rearward, a compressed air supply path that extends through the stationary shaft and opens at a forward end of the stationary shaft to supply compressed air between the first and second pistons, an air discharge path for discharging the compressed air supplied between the first and second pistons to the outside of the housing when the first and second pistons are driven rearward and forward, respectively, and separated by a predetermined distance by the compressed air supplied therebetween against the first and second urging means. Further, the pneumatic tool includes a valve member provided in the compressed air supply path. The valve member is displaceable between a closed position where it closes the compressed air supply path and an open position closer to the rear end of the housing than the closed position, where the valve member opens the compressed air supply path. The pneumatic tool further includes a valve opening-closing shaft provided in the second piston to extend into the compressed air supply path. The valve opening-closing shaft is designed so that when the first and second pistons are separated from each other by the predetermined distance in response to the supply of compressed air, the valve opening-closing shaft allows the valve member to assume the closed position, whereas when the first and second pistons come closer to each other than the predetermined distance as a result of discharge of the compressed air, the valve opening-closing shaft displaces the valve member from the closed position to the open position.

These pneumatic tools can be made simple in structure and light in weight in comparison to the aforementioned conventional tools. In addition, the pneumatic tools of the present invention can smoothly supply and discharge compressed air and can be driven with a low air consumption in comparison to the conventional tools.

Specifically, the pneumatic tool may be arranged as follows. The second piston is a tubular member having a closed forward end and an open rear end. The first piston is slidably inserted into the second piston from the open rear end thereof. The air discharge path has a through-hole formed in the tubular side wall of the second piston so that when the first and second pistons are separated from each other by a predetermined distance by compressed air supplied therebetween, the through-hole is communicated with a space between the first and second pistons.

Conversely to the above, the pneumatic tool may be arranged as follows. The first piston is a tubular member having a closed rear end and an open forward end. The second piston is slidably inserted into the first piston from the open forward end thereof. The air discharge path has a through-hole formed in the tubular side wall of the first piston so that when the first and second pistons are separated from each other by a predetermined distance by compressed air supplied therebetween, the through-hole is communicated with a space between the first and second pistons.

Further, the pneumatic tool may be arranged as follows. The second piston is prevented from rotating about its own axis. The tool attachment member is mounted in coaxial relation to the second piston with a tool attached to the forward end thereof. The tool attachment member is oscillatable about the axis. The second piston and the tool attachment member are drivingly connected to each other by a conversion mechanism that converts a reciprocating motion of the second piston into an oscillating motion of the tool attachment member oscillating within a predetermined angle range about the axis thereof. The conversion mechanism has a pin provided on either one of the second piston and the tool attachment member, and a pin guide portion provided on the other of the second piston and the tool attachment member so as to be slidably engaged with the pin. The pin guide portion is provided along a spiral around the axis and has a length in the direction of the axis that is at least equal to the reciprocating length of the second piston in the direction of the axis. Thus, the conversion mechanism oscillates the tool attachment member in response to the second piston being reciprocated.

In this case, if the tool attached to the tool attachment member is a grinding tool (grinder), the pneumatic tool can be used in operations such as deburring and chamfering. Usually, a rotary grinding tool is used for deburring or chamfering. In this case, because the rotational speed of the grinding tool becomes high, the grinding tool may be repelled from the part being ground or may be broken. Such a problem can be avoided by using an oscillating grinding tool arranged as stated above.

Specifically, the pneumatic tool may be arranged as follows. The tool attachment member has a circular columnar shape as a whole. The second piston is positioned out of contact with the inner surface of the housing and engaged with the tool attachment member so as to be slidable in the direction of the axis and rotatable about the axis relative to the tool attachment member. The second urging means is a coil spring provided around the tool attachment member. To prevent rotation of the second piston about the axis, the forward end of the coil spring is connected to a spring support member secured to the housing, and the rear end of the coil spring is connected to the second piston.

More specifically, the spring support member may comprise a part of a bearing means attached to the housing at a position forward of the second piston to support the tool attachment member rotatably about the axis.

When the tool attachment member is adapted to oscillate, the second piston is preferably prevented from rotating about its own axis. In this case, the second piston may be prevented from rotation by placing the second piston in sliding contact with the inner peripheral surface of the housing and forming their mutually sliding surfaces into a shape other than circular. In such a case, because the second piston is in direct contact with the housing, the vibration of the housing increases. Such a problem can be avoided in the present invention by adopting the arrangement described above. It should be noted, however, that the prevention of rotation of the second piston by the coil spring does not necessarily mean a perfect one but may be one enough to suppress the rotation of the second piston.

Further, the pneumatic tool may be arranged as follows. The second piston has a tubular portion that receives a rear end portion of the tool attachment member so that the tool attachment member is slidable in the direction of the axis and rotatable about the axis direction. The pin guide portion of the conversion mechanism is a guide groove formed on the tubular portion of the second piston. The pin of the conversion mechanism is formed to project from diametrically opposing sides of the rear end portion of the tool attachment member. A radial bearing is attached to the pin. The radial bearing has an outer race and an inner race having an axis of the pin as a center of rotation. Thus, the pin is guided along the guide groove through the radial bearing.

In a case where the prevention of rotation of the second piston by the coil spring is not perfect, when the pin provided on the tool attachment member is guided along the guide groove to cause the tool attachment member to rotate, the second piston is urged to rotate in the opposite direction by its counteraction. Even in such a case, the radial bearing reduces the force applied to the second piston from the pin so as to urge the second piston to rotate, thus minimizing the rotation of the second piston. Consequently, the rotational movement (pivotal movement) of the tool attachment member can be increased.

DETAILED DESCRIPTION OF THE INVENTION

An embodiment in which the present invention is applied to an oscillating grinding tool will be explained in detail with reference to FIGS. 1 and 2.

Figure 1:
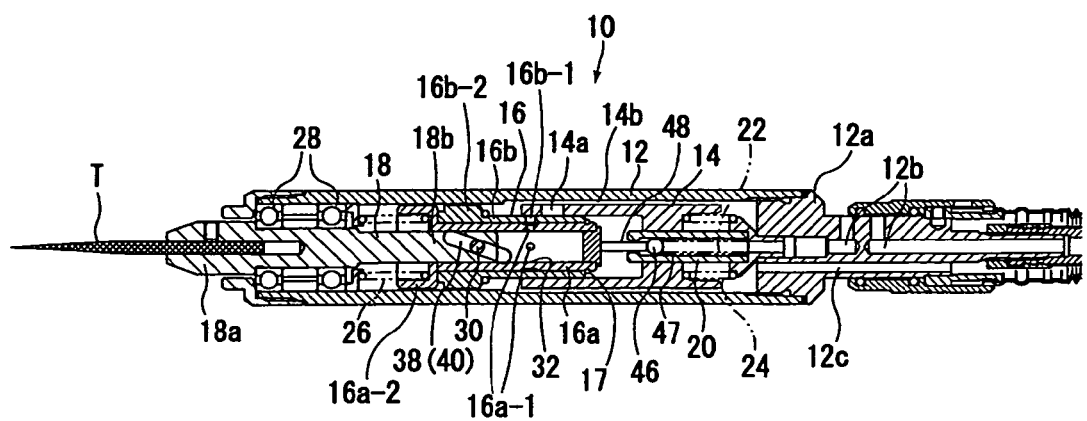
FIG. 1 is a longitudinal sectional view of a pneumatic oscillating grinding tool according to the present invention, showing a state where compressed air for driving the tool has been partly introduced into the tool.

FIG. 1 is a sectional side view of an oscillating grinding tool 10 according to the present invention. FIG. 2 is an exploded view illustrating the oscillating grinding tool 10, with a tubular housing 12 removed therefrom to show main elements mounted in the housing 12.

The oscillating grinding tool 10 has a tubular housing 12 and other main elements that are coaxially mounted in the housing 12, i.e. a tubular first piston 14 slidable in the axial direction of the housing 12, a second piston 16 slidable in the first piston 14, and a tool attachment oscillating member 18 drivingly connected to the second piston 16 and oscillating about the longitudinal axis thereof.

The first piston 14 is urged forward by a compression coil spring 24 set between the first piston 14 and the rear end of the housing 12. The second piston 16 is urged rearward by a compression coil spring 26 set between the second piston 16 and the forward end of the housing 12.

The rear end of the housing 12 is closed with a rear end member 12a. The rear end member 12a has a compressed air supply path 12b and an air discharge path 12c. A stationary shaft 20 is provided to extend forward from the rear end member 12a along the axis of the housing 12. The shaft 20 extends through a shaft sliding hole 14c in the first piston 14. Compressed air is supplied into the first piston 14 through a compressed air supply path 22 extending through the shaft 20 (and communicating with the compressed air supply path 12b) to drive the first piston 14 rearward against the compression coil spring 24 and the second piston 16 forward against the compression coil spring 26. The air discharge path 12c enables communication between the interior of the housing 12 with the outside thereof.

In the illustrated example, the second piston 16 is formed by fitting and securing together an inner tubular member 16a and an outer tubular member 16b. The outer tubular member 16b is formed from a resin material and secured to the inner tubular member 16a with a stop ring 17, thereby enabling the outer tubular member 16b to be replaced easily. The inner and outer tubular members 16a and 16b are provided with respective air discharge holes 16a-1 and 16b-1 radially extending therethrough and communicating with each other to enable discharge of air to the outside from the interior 32 of the second piston 16. The inner and outer tubular members 16a and 16b have large-diameter portions 16a-2 and 16b-2 provided at the respective left end portions as viewed in the figures. The large-diameter portions 16a-2 and 16b-2 have a hexagonal outer shape, for example, so as to be slidably engaged with a similar hexagonal portion of the inner peripheral surface of the housing 12, thus preventing the second piston 16 from rotating about its own axis.

A conversion mechanism is provided between the second piston 16 and the tool attachment oscillating member 18 to convert the reciprocating motion of the second piston 16 into an oscillating motion of the tool attachment oscillating member 18 about the axis thereof.

More specifically, in the illustrated example, the tool attachment oscillating member 18 is rotatably supported by a radial bearing 28 provided in the housing 12 at the forward end thereof. The tool attachment oscillating member 18 is adapted to hold a grinding tool T at a forward end portion 18a thereof. A circular columnar rear end portion 18b of the tool attachment oscillating member 18 is loosely fitted in the inner tubular member 16a of the second piston 16. The rear end portion 18b is provided near its rear end with a pin 30 extending diametrically therethrough. Two opposite ends of the pin 30 project radially outward from the rear end portion 18b to form followers 30a and 30b. A pair of guide portions are provided at diametrically opposing positions on the peripheral wall of the inner tubular member 16a of the second piston 16. The guide portions are inclined with respect to the longitudinal axis of the second piston 16 to slidably engage with the followers 30a and 30b, respectively. In the illustrated example, guide grooves 38 and 40 that receive the followers 30a and 30b are provided as the guide portions.

In a state where no compressed air is supplied, the first piston 14 and the second piston 16 are placed closer to each other than the illustrated positions by the compression coil springs 24 and 26, and forward end portions of the guide grooves 38 and 40 are positioned to engage with the followers 30a and 30b, respectively. When compressed air is supplied and consequently the first piston 14 and the second piston 16 are driven rearward and forward, respectively, against the compression coil springs 24 and 26, rear end portions of the guide grooves 38 and 40 are positioned to engage with the followers 30a and 30b, respectively. Accordingly, the tool attachment oscillating member 18 is oscillated within a predetermined angle range about the longitudinal axis thereof in response to the second piston 16 being reciprocated in the longitudinal direction.

The first piston 14 has an air discharge opening 14a provided in the peripheral wall near the forward end thereof. The air discharge opening 14a is communicated with an air discharge passage 14b provided to extend axially on the outer peripheral surface of the first piston 14. The air discharge passage 14b is formed between the outer peripheral surface of the first piston 14 and the inner peripheral surface of the housing 12 by forming the outer peripheral surface of the first piston 14 into a hexagonal cross-section as shown in FIG. 2. When compressed air is supplied, the second piston 16 is advanced while the first piston 14 is retracted. When the first piston 14 reaches a predetermined position, the air discharge opening 14a is located rearward of the rear end of the second piston 16. Consequently, compressed air supplied into the first piston 14 is discharged to the outside through the air discharge opening 14a and the air discharge passage 14b.

In the illustrated example, the compressed air supply path 22 of the stationary shaft 20 is provided therein with a ball-shaped valve member 46 that is displaceable between a closed position where it closes the compressed air supply path 22 and an open position closer to the rear end of the housing 12 than the closed position, where the valve member 46 opens the compressed air supply path 22. The valve member 46 is urged toward the closed position by a compression spring 47 provided in the compressed air supply path 22. Meanwhile, the second piston 16 is provided with a valve opening-closing shaft 48 extending into the compressed air supply path 22. When the first piston 14 and the second piston 16 are separated from each other in response to the supply of compressed air, the valve opening-closing shaft 48 allows the valve member 46 to assume the closed position to stop the supply of compressed air. When the first and second pistons 14 and 16 move toward each other as a result of discharge of compressed air, the valve opening-closing shaft 48 displaces the valve member 46 from the closed position to the open position to allow supply of compressed air.

The following is an explanation of an embodiment (FIGS. 3 and 4) in which the present invention is applied to a reciprocating tool.

The reciprocating tool has a tubular housing 50, a stationary shaft 52, a first piston 56, a second piston 58, and a tool attachment member 60. The stationary shaft 52 extends forward from the rear end of the housing 50 in the axial direction of the housing 50. The first piston 56 has a shaft sliding hole 54 slidably engaged with the stationary shaft 52 so that the first piston 56 is slidable along the stationary shaft 52. The second piston 58 is provided at the forward end of the first piston 56. The tool attachment member 60 is connected to the second piston 58 and extends forward in the axial direction of the housing 50 through the forward end thereof. The tool attachment member 60 is adapted to attach a tool T to the forward end thereof.

Figure 3:
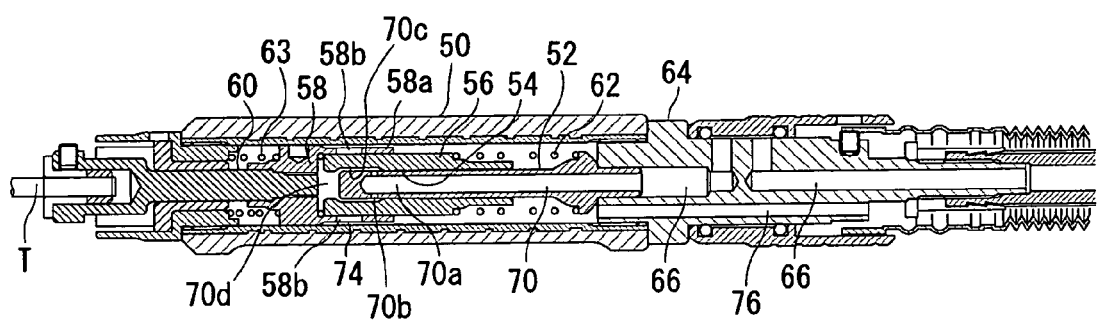
FIG. 3 is a longitudinal sectional view of a pneumatic reciprocating tool according to the present invention, showing a state where compressed air has not yet been supplied thereinto.
Figure 4:
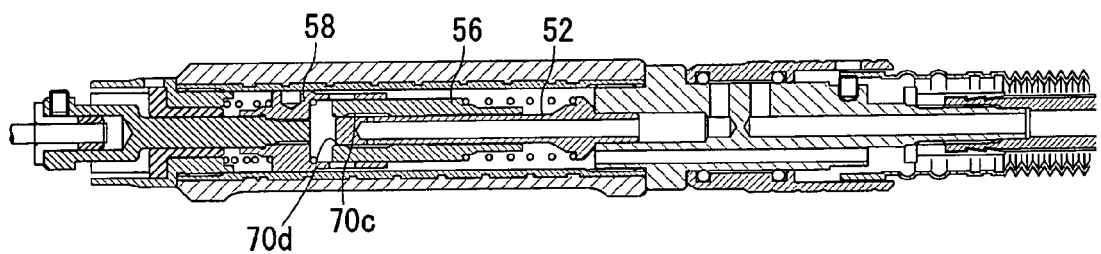
FIG. 4 is a longitudinal sectional view of the tool in FIG. 3, showing a state where the tool has been driven to advance by compressed air supplied thereinto.

The first piston 56 is urged forward by a first urging means (compression spring) 62. The second piston 58 is urged rearward by a second urging means (compression spring) 63. In a state where no compressed air is introduced, the first and second pistons 56 and 58 are kept close to each other as shown in FIG. 3 by the first and second urging means 62 and 63.

The stationary shaft 52 is fixed to a rear end member 64 that closes the rear end of the housing 50. The stationary shaft 52 has a compressed air supply path 70 that receives compressed air from a compressed air introducing path 66 extending through the rear end member 64 and communicated with a pump (not shown) and that supplies the compressed air between the first and second pistons 56 and 58. In the illustrated example, the compressed air supply path 70 has an axial portion 70a extending through the stationary shaft 52 toward the forward end thereof, a radial portion 70b extending radially from the axial portion 70a and opening on the side surface of the stationary shaft 52, a compressed air inlet recess or space 70c provided on the inner wall surface of the shaft sliding hole 54 of the first piston 56 and communicated with the radial portion 70b to receive compressed air, and a supply outlet 70d extending forward from the forward end of the compressed air inlet recess 70c and communicating with the space between the first and second pistons 56 and 58.

In the illustrated example, the second piston 58 has a tubular wall 58a extending rearward, and the forward end portion of the first piston 56 is slidably inserted in the tubular wall 58a. The tubular wall 58a has through-holes 58b provided at diametrically opposing positions. When compressed air is supplied between the first and second pistons 56 and 58 through the compressed air supply path 70, the first and second pistons 56 and 58 are driven rearward and forward against the first and second urging means 62 and 63, respectively. When the first and second pistons 56 and 58 have been separated from each other by a predetermined distance, the through-holes 58b are communicated with the space between the first and second pistons 56 and 58 to discharge the compressed air supplied into the space. In the illustrated example, the through-holes 58b are communicated with a gap 74 between the outer peripheral surface of the tubular wall 58a and the inner peripheral surface of the housing 50. Consequently, the compressed air is discharged to the outside through the gap 74 and through an air discharge path 76 formed in the rear end member 64.

At substantially the same time as the compressed air is discharged, the supply outlet 70d of the compressed air supply path 70 reaches the forward end portion of the stationary shaft 52. Consequently, the communication between the compressed air inlet recess 70c and the supply outlet 70d is cut off to stop the supply of compressed air between the first and second pistons 56 and 58.

As will be clear from the above, in this reciprocating tool, the first and second urging means 62 and 63 act so that the first and second pistons 56 and 58 are placed in close proximity to each other as shown in FIG. 3. On the other hand, compressed air supplied between the first and second pistons 56 and 58 drive them to separate from each other. When the first and second pistons 56 and 58 have been driven to move away from each other by a predetermined distance (FIG. 4), the supply of compressed air is stopped, and discharge of air is performed, thereby allowing the first and second pistons 56 and 58 to be returned to the previous positions. This operation is repeated to drive the tool T reciprocatively.

Figure 2:
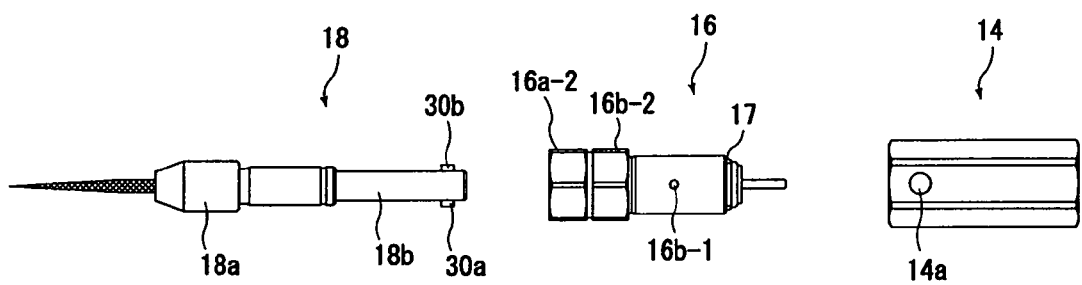
FIG. 2 is an exploded side view illustrating the tool in FIG. 1, with a housing thereof removed to show main elements in the housing.
Figure 5:
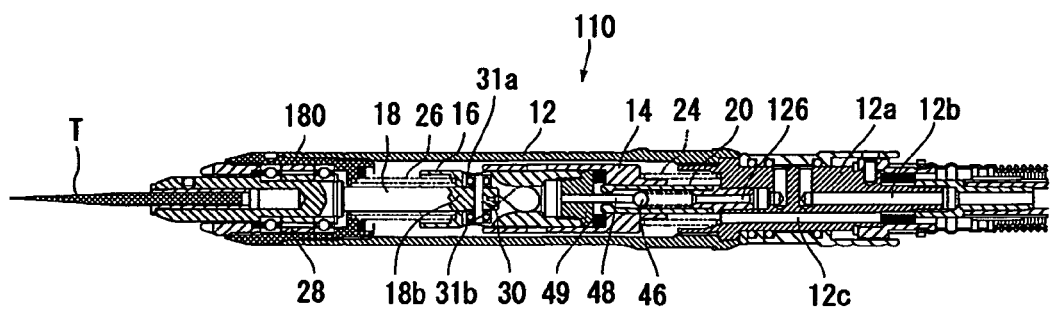
FIG. 5 is a longitudinal sectional view of a modification of the oscillating grinding tool shown in FIGS. 1 and 2.
Figure 6:
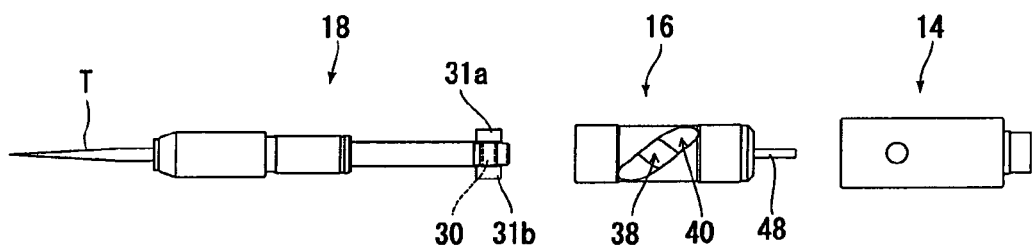
FIG. 6 is an exploded side view illustrating the tool in FIG. 5, with a housing thereof removed to show main elements in the housing.

FIGS. 5 and 6 show a modification of the oscillating grinding tool shown in FIGS. 1 and 2. The basic arrangement of the oscillating grinding tool 110 is the same as that of the tool shown in FIGS. 1 and 2. Therefore, the same constituent elements as those in FIGS. 1 and 2 are denoted by the same reference numerals.

That is, the oscillating grinding tool 110 has as main constituent elements a tubular housing 12, a first piston 14, a second piston 16, a tool attachment oscillating member 18 drivingly connected to the second piston 16, and compression coil springs 24 and 26.

The second piston 16 is a tubular member and has a retaining member 49 secured to the rear end thereof. The retaining member 49 closes the rear end of the second piston 16 and retains a valve opening-closing shaft 48. A pair of guide grooves 38 and 40 are provided at diametrically opposing positions on the tubular wall of the second piston 16. The tool attachment oscillating member 18 has a circular columnar shape as a whole and is rotatably supported by a radial bearing 28 provided in the housing 12 at the forward end thereof. A rear end portion 18b of the tool attachment oscillating member 18 is loosely fitted in the second piston 16. The rear end portion 18b is provided with a pin 30 extending diametrically therethrough. The pin 30 has radial bearings 31a and 31b attached to the opposite ends thereof. The radial bearings 31a and 31b are received in the guide grooves 38 and 40, respectively. The radial bearings 31a and 31b are general-purpose radial bearings each comprising an inner race secured to one end of the pin 30 and an outer race rotatably attached through a ball bearing. The radial bearings 31a and 31b reduce frictional resistance between the pin 30 and the guide grooves 38 and 40.

When the first piston 14 and the second piston 16 are moved rearward and forward, respectively, by the action of compressed air, the tool attachment oscillating member 18 is oscillated within a predetermined angle range about its longitudinal axis, in the same way as in the embodiment shown in FIGS. 1 and 2.

The feature of the oscillating grinding tool 110 resides in the means for preventing rotation of the second piston 16. In the oscillating grinding tool 10 shown in FIGS. 1 and 2, the mutually sliding surfaces of the housing 12 and the second piston 16 each have a hexagonal cross-section to prevent rotation of the second piston 16 about its own axis. In the oscillating grinding tool 110, as shown in the figure, the second piston 16 is separate from the inner peripheral surface of the housing 12, and instead, the forward end of the compression coil spring 26 is press-fitted into a rearward facing recess of a radial bearing retaining member 180 so as to be secured to the retaining member 180. In addition, the rear end of the compression coil spring 26 is press-fitted into the second piston 16 so as to be secured to the second piston 16. In short, the compression coil spring 26 urges the second piston 16 rearward and, at the same time, substantially prevents, by its resilience, the second piston 16 from rotating about its own axis.

In a case where the rotation of the second piston 16 is prevented by the mutually sliding surfaces of the housing 12 and the second piston 16 as shown in FIGS. 1 and 2, the motion of the second piston 16 that urges it to rotate is transmitted directly to the housing 12, causing the vibration of the housing 12 to increase. This is avoided by the arrangement of the oscillating grinding tool 110.

Although some embodiments of the present invention have been described above, the present invention is not necessarily limited to these embodiments but can be modified in a variety of ways without departing from the scope of the invention set forth in the appended claims. For example, in the embodiment of the present invention shown in FIGS. 1 and 2, it is possible to eliminate the valve member 46 and omit the valve mechanism. The valve mechanism may be any of various types, provided that the compressed air supply path is opened and closed by the movement of the first and second pistons.

The invention claimed is:
1. A pneumatic tool comprising:
a tubular housing having a rear end and a forward end;
a stationary shaft having a rear end, a forward end, and extending in the housing forward from the rear end of the housing in an axial direction of the housing;

a first piston having a forward end and a shaft sliding hole longitudinally extending therethrough and being slidably engaged with the stationary shaft so that the first piston is slidable along the stationary shaft, the shaft sliding hole having an inner wall surface and a forward end portion;

a second piston disposed at the forward end of the first piston;

a tool attachment member drivingly connected to the second piston and extending forward in the axial direction of the housing through the forward end of the housing, the tool attachment member being configured to attach a tool to a forward end thereof;

a first urging member configured to urge the first piston forward;

a second urging member configured to urge the second piston rearward;

a compressed air supply path configured to supply compressed air between the first piston and second piston; and an air discharge path for discharging the compressed air supplied between the first piston and second piston to an outside of the housing when the first piston and the second piston are driven rearward and forward, respectively, and separated by a predetermined distance by the compressed air supplied therebetween and against the first urging member and the second urging member;

the compressed air supply path comprising an axial portion extending in the stationary shaft along an axis of the stationary shaft, the axial portion having a rear end configured to be connected to a compressed air source and extending from the rear end of the stationary shaft to a position adjacent a forward end of the stationary shaft, a radial portion extending radially from the axial portion at a position adjacent the forward end of the stationary shaft and opening on a side surface of the stationary shaft, and a recess in the inner wall surface of the shaft sliding hole behind the forward end portion of the shaft sliding hole, the recess extending in an axial direction of the shaft sliding hole and being in communication with the radial portion of the compressed air supply path to receive compressed air, the recess extending forward beyond the forward end of the stationary shaft to enable compressed air to be supplied between the first piston and the second piston from the axial portion through the radial portion, the compressed air inlet space and a forward end portion of the shaft sliding hole; and wherein the first piston is positioned relative to the stationary shaft such that when the first piston and the second piston are driven to move away from each other by the predetermined distance by compressed air supplied therebetween, the forward end portion of the shaft sliding hole reaches the forward end of the stationary shaft, so that a forward end of the stationary shaft blocks compressed air from being supplied between the first piston and second piston from the compressed air inlet space through the forward end portion of the shaft sliding hole, and wherein the air discharge path is configured to discharge the compressed air supplied between the first piston and the second piston when the first piston and the second piston are driven to move away from each other by the predetermined distance.

2. The pneumatic tool of claim 1, wherein the second piston is a tubular member having a tubular side wall, a closed forward end and an open rear end, the first piston being slidably inserted into the second piston from the open rear end; and the air discharge path comprises a through-hole formed in the tubular side wall of the second piston so that when the first piston and the second piston are separated from each other by the predetermined distance by compressed air supplied therebetween, the through-hole is in communication with a space between the first piston and the second piston.

3. The pneumatic tool of claim 1, wherein the first piston is a tubular member having a tubular side wall, a closed rear end and an open forward end, the second piston being slidably inserted into the first piston from the open forward end; and the air discharge path comprises a through-hole formed in the tubular side wall of the first piston so that when the first piston and the second piston are separated from each other by the predetermined distance by compressed air supplied therebetween, the through-hole is in communication with a space between the first piston and the second piston.

4. The pneumatic tool of claim 1, wherein the second piston is prevented from rotating about an axis thereof;

the tool attachment member is mounted in coaxial relation with the second piston and has a tool attached to the forward end thereof, the tool attachment member being oscillatable about the axis of the second piston; and the second piston and the tool attachment member are drivingly connected to each other by a conversion mechanism that converts a reciprocating motion of the second piston into an oscillating motion of the tool attachment oscillating member within a predetermined angle range about an axis thereof, the conversion mechanism comprising:

a pin provided on either one of the second piston and the tool attachment member; and a pin guide portion provided on the other of the second piston and the tool attachment member so as to be engaged with the pin, the pin guide portion being disposed along a spiral around the axis of the second piston and having a length in a direction of the axis of the second piston that is at least equal to a reciprocating length of the second piston in the direction of the axis of the second piston, so that the conversion mechanism oscillates the tool attachment member in response to the second piston being reciprocated.

5. The pneumatic tool of claim 4, wherein the tool attachment member has a circular columnar shape;

the second piston is positioned out of contact with an inner surface of the housing and engaged with the tool attachment member so as to be slidable in the direction of the axis of the second piston and rotatable about the axis of the second piston relative to the tool attachment member;

the second urging member is a coil spring having a forward end, a rear end, and being provided around the tool attachment member; and wherein to prevent rotation of the second piston about the axis of the second piston, the forward end of the coil spring is connected to a spring support member secured to the housing, and the rear end of the coil spring is connected to the second piston.

6. The pneumatic tool of claim 5, wherein the spring support member comprises a part of a bearing member attached to the housing at a position forward of the second piston to support the tool attachment member rotatably about the axis of the second piston.

7. The pneumatic tool of claim 5, wherein the second piston has a tubular portion that receives a rear end portion of the tool attachment member so that the tool attachment member is slidable in the direction of the axis of the second piston and rotatable about the direction of the axis of the second piston;
  the pin guide portion of the conversion mechanism is a guide groove formed on the tubular portion of the second piston;
  the pin of the conversion mechanism is formed to project from diametrically opposing sides of the rear end portion of the tool attachment member;
  wherein a radial bearing is attached to the pin, the radial bearing comprising an outer race and an inner race having an axis of the pin as a center of rotation, so that the pin is guided along the guide groove through the radial bearing.

* * * * *